United States Patent [19]

Hopkins

[11] 4,093,392

[45] June 6, 1978

[54] MILLING CUTTER

[75] Inventor: David Alan Hopkins, Detroit, Mich.

[73] Assignee: The Valeron Corporation, Oak Park, Mich.

[21] Appl. No.: 566,727

[22] Filed: Apr. 10, 1975

[51] Int. Cl.² .............................................. B26D 1/12
[52] U.S. Cl. ........................................ 407/48; 407/51; 407/55; 407/59
[58] Field of Search ............. 29/105 R, 105 A, 103 A

[56] References Cited

U.S. PATENT DOCUMENTS

| | | | |
|---|---|---|---|
| 2,207,909 | 7/1940 | Besaw | 29/105 R |
| 2,630,725 | 3/1953 | Black | 29/105 R |
| 2,645,003 | 7/1953 | Thompson et al. | 29/105 R |
| 2,664,617 | 1/1954 | Kralowetz | 29/105 R |
| 3,103,736 | 9/1963 | Ortman | 29/105 R |
| 3,213,716 | 10/1965 | Getts | 29/105 A |
| 3,354,526 | 11/1967 | Erkfritz | 29/96 |
| 3,371,397 | 3/1968 | Coleshill et al. | 29/105 R |
| 3,540,103 | 11/1970 | Saari | 29/105 R |

FOREIGN PATENT DOCUMENTS

| | | | |
|---|---|---|---|
| 386,505 | 12/1923 | Germany | 29/105 R |
| 425,112 | 2/1926 | Germany | 29/105 R |
| 896,902 | 11/1953 | Germany | 29/105 R |

Primary Examiner—Leonidas Vlachos

[57] ABSTRACT

An indexable insert milling cutter having multiple round inserts located in staggered individual isolated pockets formed in the annular periphery of the cutter body. Each insert is trapped in its pocket with only a small fraction of the cutting edge projecting beyond the periphery of the body. A chip clearance wall extends outwardly from the cutting face of the insert to the periphery of the body.

28 Claims, 15 Drawing Figures

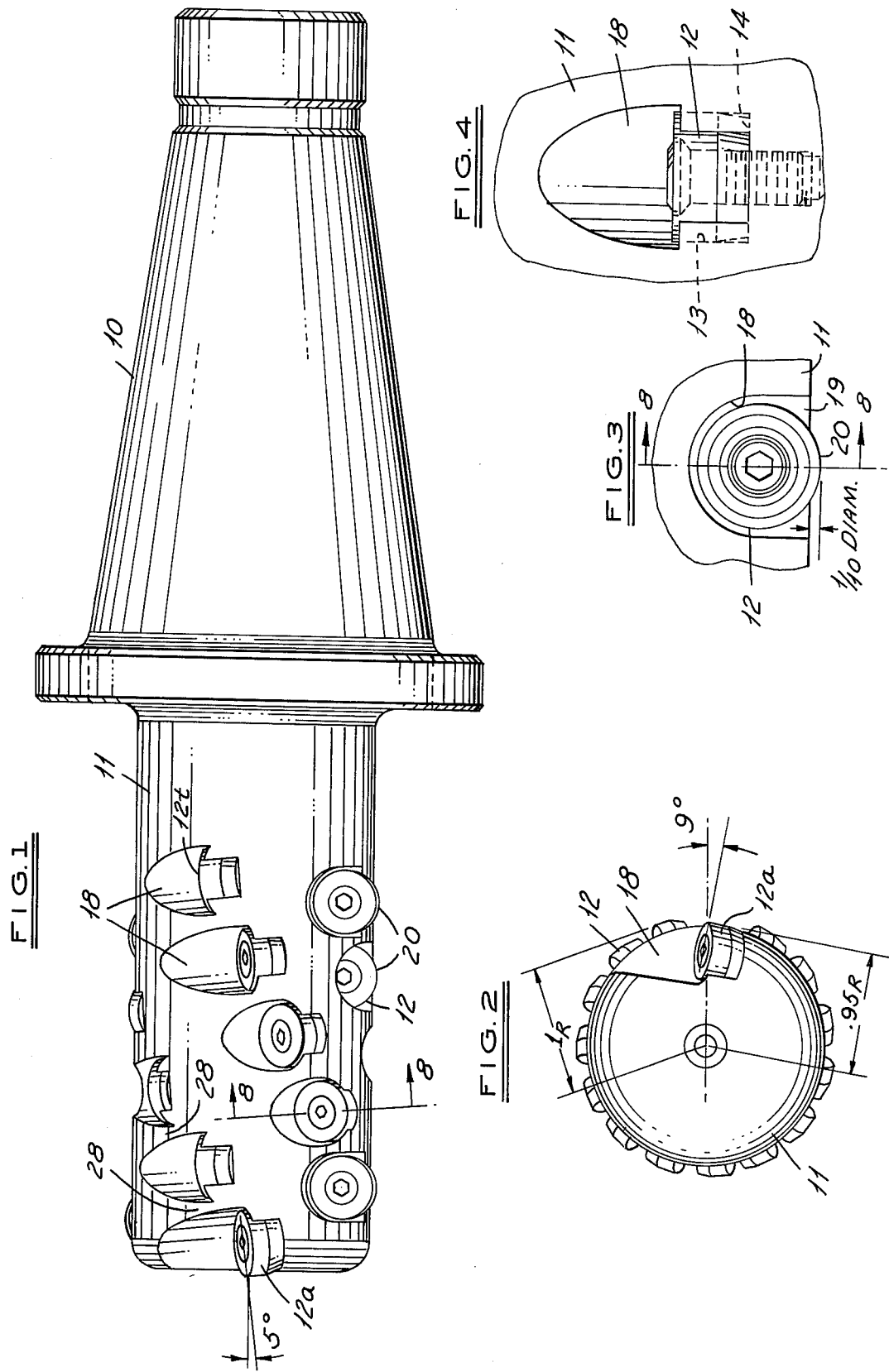

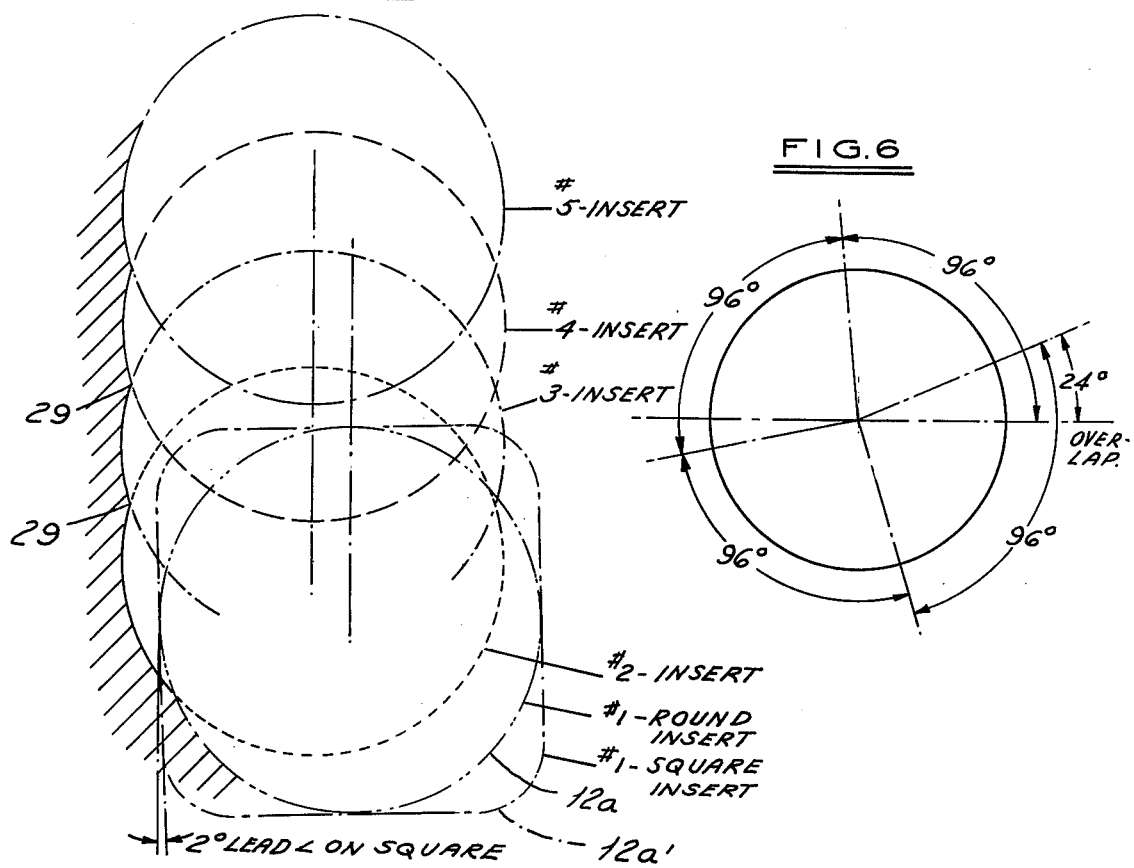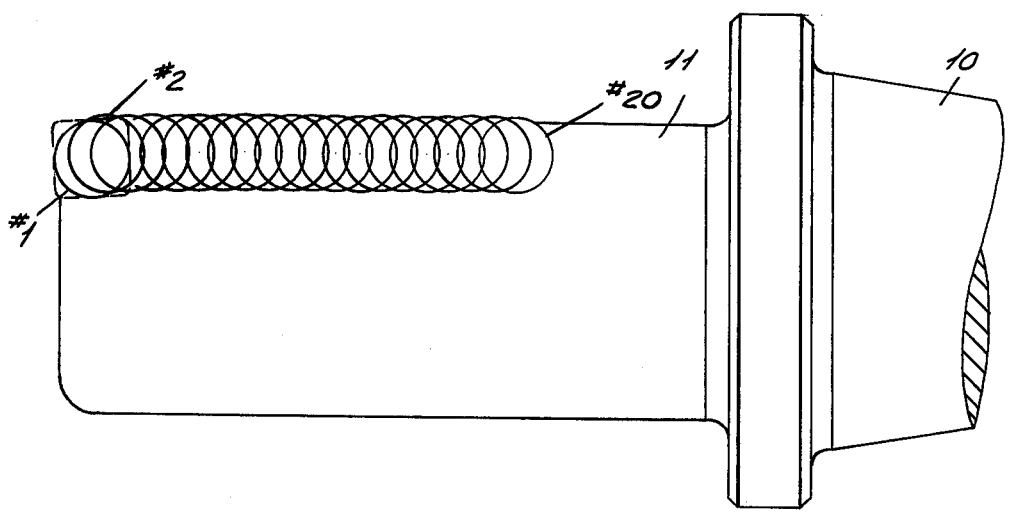

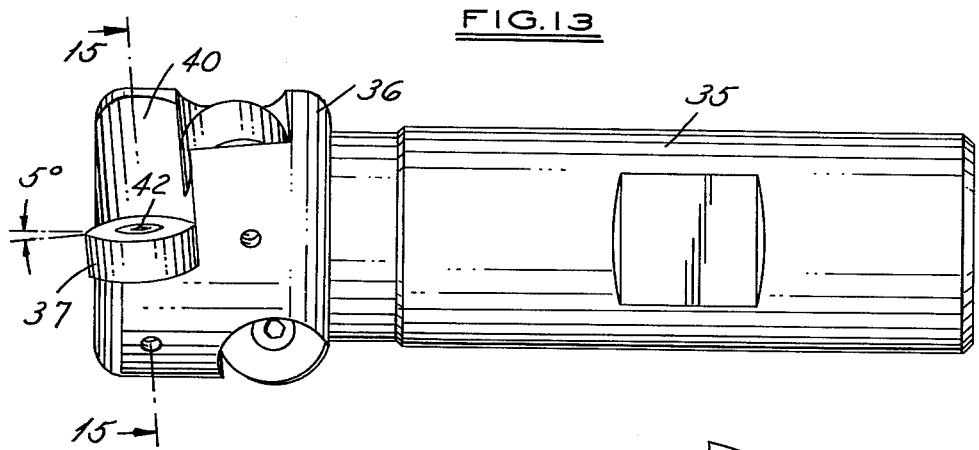
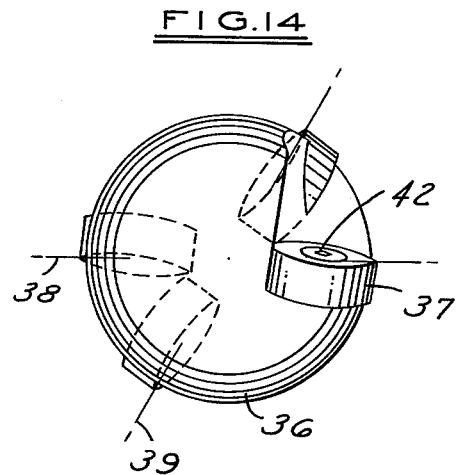
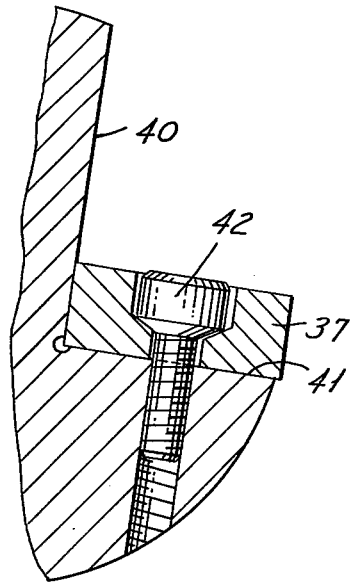

MILLING CUTTER

BACKGROUND OF THE INVENTION

Multiple round insert milling cutters have been employed in form cutters, used for example in trueing metal wheels of rail vehicles. Such prior art tools have generally employed round cutting inserts located in insert pockets formed in angular slots in the cutter body or in separate plates which are anchored within angularly extending slots formed in the cutter body. These constructions substantially reduce the strength of the cutter body and the effective rake angles of the inserts change for successive inserts along the length of the cutter. This reduces overall efficiency of the cutter and causes greater wear on some of the inserts.

The closest known prior art comprises the following patents: U.S. Pat. Nos. 2,645,003; 3,103,736; 3,540,103; 3,213,716.

SUMMARY OF THE INVENTION

The present construction is directed to a general purpose heavy duty milling cutter which can incorporate a substantial number of indexable insert cutting elements, especially in cutters with relatively small diameters. Milling cutters according to this invention can have greater effective cutting length for any given cutting diameter with a minimum number of cutting inserts.

Maximum rigidity is retained in the extended body of the end mill by having all pockets formed integrally within the periphery of the body per se, as individual isolated pockets each of which, with its chip clearance wall, is isolated from the others and entirely surrounded by peripheral material of the body. Progressive staggered cutting insert entrance may be provided resulting in minimum horsepower and maximum efficiency relative to other indexable insert milling cutters and with relatively stable chatter free cutting action. Each cylindrical cutting insert is entrapped in its integral pocket, with only approximately 10% of its cutting diameter projecting from the periphery. This makes this invention especially applicable to relatively small diameter end mills and slotting mills; also to slab mills and face mills.

IN THE DRAWINGS

FIG. 1 is a side elevation of a milling cutter constructed in accordance with the present invention;

FIG. 2 is an end view of the cutter shown in FIG. 1;

FIG. 3 is an enlarged fragmentary plan view of a cutting insert as installed in a recess pocket;

FIG. 4 is a side elevation of the insert and recess pocket illustrated in FIG. 3;

FIG. 5 is an enlarged fragmentary schematic view showing the relative paths of successive cutter elements in a typical embodiment as related to a common plane;

FIG. 6 is an end view layout illustrating an appropriate angular positioning of successive cutting inserts along the helical path to provide desired staggered relationship;

FIG. 7 is a fragmentary side elevation on the same scale as FIG. 1 illustrating schematically the path of all cutting inserts as rotated to a common plane;

FIG. 13 is a side elevation of a modified form of milling cutter employing a different staggered relationship of cutting inserts;

FIG. 14 is an end view of the milling cutter shown in FIG. 13; and,

FIG. 15 is an enlarged fragmentary sectional view of a single insert taken along line 15—15 of FIG. 13.

With reference to FIG. 1 illustrating an embodiment of a heavy duty roughing end mill constructed in accordance with the present invention, a conventional tapered shank 10 is provided with an integral cylindrical body extension 11 having, in the present case, 20 cutting inserts 12 installed in the periphery thereof along a single helical path and with such successive angular relationship as to provide a desired staggered relationship between adjacent cutting elements on adjacent convolutions of the helix as hereinafter described in detail.

Figure 8:
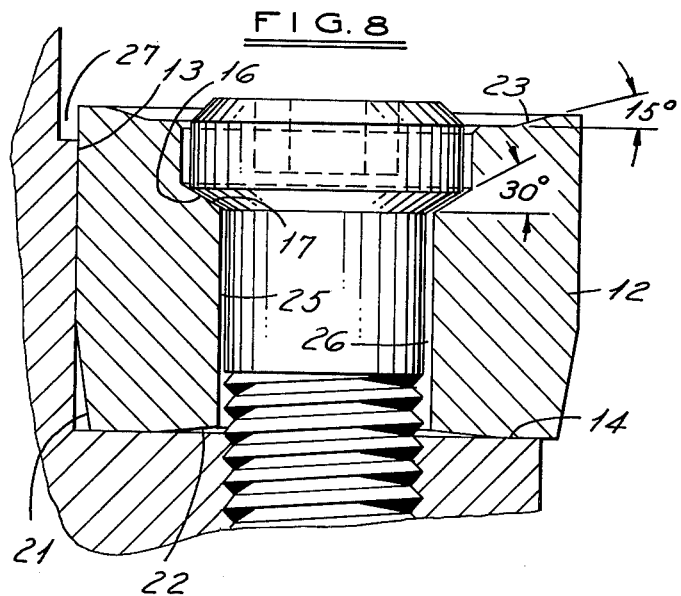
FIG. 8 is a further enlarged fragmentary sectional elevation taken along the line 8—8 of FIG. 3 and of FIG. 1.

The single helical path referred to passes successively through all inserts in the order of their axial spacing and is not to be confused with the multiple aparent helical path extending longitudinally of the tool. With reference to FIGS. 3, 4, and 8, each cutting insert 12 is cylindrical in general form to provide indexing for fresh cutting edge and is held in an insert pocket having a cylindrical wall 13 terminating in an end seat 14 by Allen head screw 15. Such screw has a tapered shoulder 16 engaging a matching 30° tapered countersunk wall 17 in the insert. In the illustrated embodiment all insert pockets are formed to position each cutting insert with a 5° negative axial rake and a 9° negative radial rake as indicated in FIGS. 1 and 2.

Each insert pocket has a chip clearance wall 18 associated therewith. Configuration of the pockets and chip clearance wals may best be understood from a description of the preferred method of machining same. An end mill having a diameter slightly greater than the insert and positioned to provide a pocket with negative axial and radial rake angles is moved radially into the periphery of the body to provide a chip clearance wall 18 extending directly outward from the intended position of the face of the cutting insert. Next, a slightly smaller center cutting end mill having a clearance diameter, in the order of 0.005 inch maximum, to the cutting insert is plunged to a depth slightly less than the insert thickness on the same axis as the final position of the chip clearance side cutter to provide the insert pocket wall 13 and seat 14.

After the clearance wall and insert pocket are machined a screw hole is drilled and tapped on an axis parallel to that of the cylindrical pocket recess but offset in the order 0.006 to 0.008 inch inwardly to assure inward seating of the insert against the wall 13 through engagement of the 30° tapered surfaces 16 and 17 of the screw head and insert, as shown in FIG. 8. A screw having a clearance diameter in the order of 0.020 inch relative to the diameter of the cylindrical aperture 25 extending centrally through the cutting insert assures adequate overall clearance 26 for insertion and insert indexing. The preferred 30° angle for the matching tapered surfaces 16 and 17 is less than a standard screw head bevel but is chosen to provide a sufficient angle to assure inward seating of the insert against the cylindrical wall 13 while minimizing radial expansion stresses on the insert which tend to cause fracturing upon tightening.

The outwardly projecting chip clearance wall 18 extends fully to the cylindrical surface 11 of the cutter body. Such chip clearance wall, shown concentric with the insert pocket in the illustrated embodiment, may be cut even deeper into the cylindrical body wall for greater chip clearance where the diameter of the cutter is adequate to provide unimpaired rigidity. In any case, the pocket recess for the cutting insert is machined radially inwardly from the body surface, preferably to provide radially trapping portions 19 to retain the insert and to provide a projecting cutting edge 20 portion beyond the perimeter of the body by an amount in the order of 10% of the cutting insert diameter, as indicated in FIG. 3. A relief taper 21 on the outer perimeter of the insert and bottom relief taper 22 adjacent are preferred to avoid high corner stresses which tend to cause fracturing. A pocket depth slightly less than the cutting insert together with the larger radius of the chip clearance wall 18 results in a relief clearance 27 (FIG. 8) protecting the cutting edge of the insert from clamping stresses. For heavy duty cutting of most metals, a 15° positive rake surface 23 extending inwardly from a narrow flat land 24 has been found to provide optimum cutting action in milling cutters of the present invention.

The staggered location of the cutting inserts, which will now be described in greater detail, is proportioned to leave an integral web of the cutter body extending radially outward to the cylindrical peripheral surface of the body to provide an isolated insert pocket and chip clearance wall for each insert, and retain substantially full rigidity of the cutter body important to heavy duty extended length rough cutting with relatively small diameter cutters without destructive chatter. While the choice of a helix angle and spacing relation of cutting elements which result in such web, inherently limit the number of inserts per linear inch of cutter body and result in a slightly grooved machine surface, as most clearly shown at 29 in FIG. 5, only a light finishing cut is required to complete machining of such surface. An extensive cutting length, as shown in FIG. 7, may be obtained with a high degree of efficiency (horsepower per cubic inch per minute of chip metal removal) with a minimum number of cutting inserts, such as the 20 in the illustrated embodiment.

FIG. 6 shows an appropriate angular spacing between successive cutting inserts along the circumferential helix of the illustrated embodiment, especially as applied to relatively small diameter cutters. The angular spacing of 96° between adjacent inserts on the single helix provides a 24° overlap in the staggered relation of adjacent cutting elements on the apparent helix in successive convolutions of the single helix spiral. This spacing allows the use of the fewest number of cutting elements of largest diameter relative to the cutter body diameter and a uniform angular spacing for effecting a given overall length of cut. For heavy duty roughing cutters relatively large diameter inserts are preferred both for their higher capacity of chip removal per insert as well as the relatively larger axial pitch between successive cutting elements that can be accommodated with adequate overlap of the cut grooves and smoothness of the overall milled surface. Within these parameters a maximum ratio of cutter insert diameter to body diameter of 1:4 is a practical limit. In the case of the illustrated FIG. 1 embodiment, ½ inch round cemented tungsten carbide inserts 0.312 inch thick were installed in a 2 inch effective diameter cutter with 0.150 inch axial spacing between all inserts except the first two. A 0.075 inch axial spacing between the end of the second insert and a 0.050 inch inward radial spacing of the first insert from the others was used.

The spacing of inserts at the end of an end mill provides lighter chip loads at entry by decreasing the length of cutting edge in the cut. This also reduces wear and produces more indexes of the lead insert.

Alternately, the lead insert may be square with rounded corners to provide a smaller corner radius which materially reduces chip temperature thereby reducing cutting edge deterioration and work hardening of the part in machining stainless steel and refractory metals. This also reduces necessary stock removal in finishing operations where square corners are required.

The angular spacing of cutting inserts together with a left hand helix direction on a right hand (clockwise) cutter provides a desirable first insert entry of the last cutter 12 $t$ (FIG. 1) closest to the base of the tool with progressive uniformly spaced entries of successive cutting inserts in each apparent helix which stabilizes the cutting action.

The angular spacing is generally within a range of 91° to 100° and preferably within a 94° to 98° range. In a cutter with many inserts, a 90° spacing of course would provide simultaneous entry of multiple cutting elements as distinguished from progressive entry of individual inserts which require less power and reduce chatter and vibration.

Figure 9:
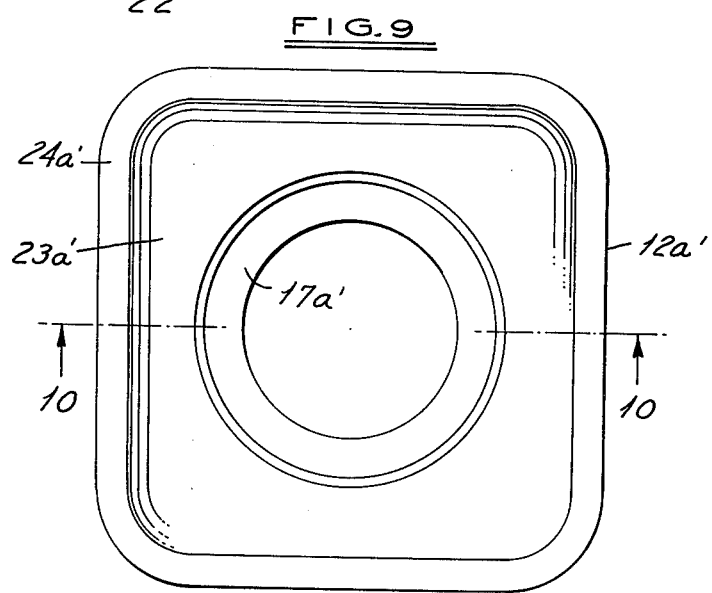
FIG. 9 is a pln view of a square insert for use in the outer-most end position.
Figure 10:
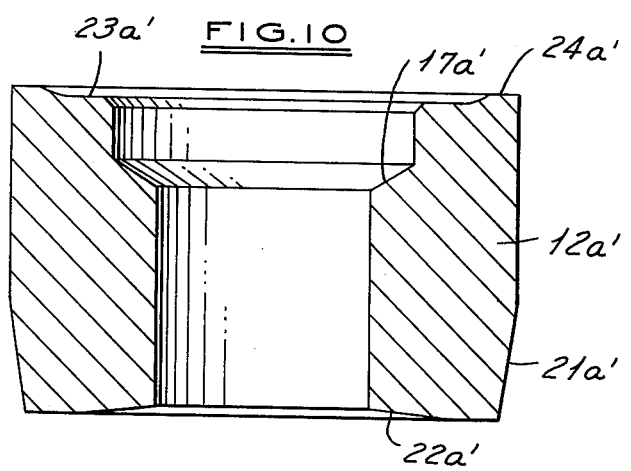
FIG. 10 is a sectional elevation of the insert illustrated in FIG. 9.

With reference to FIGS. 9 and 10, the square insert schematically illustrated in FIGS. 5 and 7 as an alternative for the endmost or number 1 insert, 12 $a'$ is shown in constructional detail to have a conically countersunk surface 17 $a'$ for engagement by the retaining screw, a bevel 21 $a'$ for relief relative to a square corner, and bevelled bottom surface 22 $a'$ for relief relative to the bottom seat at the screw hole similar to the round insert of FIG. 8; likewise, a dished upper face 23 $a'$ with a marginal flat 24 $a'$ provides similar cutting action to the round insert of FIG. 8.

Figure 11:
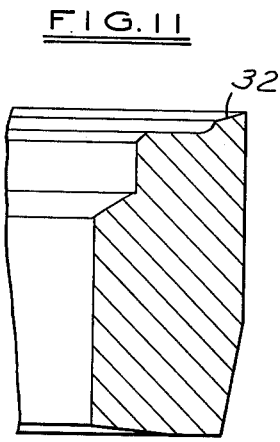
FIG. 11 is a fragmentary sectional elevation of a modified insert having a positive rake cutting lip.

With reference to FIG. 11, an alternative positive rake insert is also illustrated having a bevelled upper outer marginal surface 32 to provide positive rake cutting action, such insert being similar to the round insert of FIG. 8 in all other respects.

Figure 12:
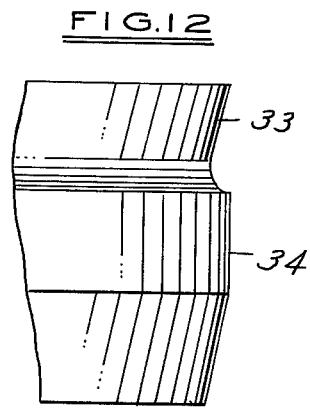
FIG. 12 is a fragmentary side elevation of a further modified positive rake form of insert.

With reference to FIG. 12, an alternative form of positive rake insert is illustrated wherein the upper side surface 33 is bevelled inwardly to provide positive rake cutting action, the cutting edge lying within the cylindrical diameter of the central portion 34 which engages the cylindrical wall 13 of the previously described cylindrical pocket.

With reference to FIGS. 13, 14 and 15, a modified form of milling cutter is illustrated suitable for small diameter end mills wherein a larger ratio of insert to body diameter is desired. Here, two pairs of diametrically opposed cutting elements are employed with the second pair from the end advanced 60° in angular relation relative to the first pair. Equal axial spacing is provided for the four inserts and the insert diameter is almost ½ that of the cutter. The shank 35 having a head 36 is thus provided with four cylindrical inserts 37 in diametrically opposed pairs having their angular relationship indicated at 38 and 39. The chip clearance wall 40 and seat 41 are formed with a single end mill fed radially with appropriate 5° axial and 9° radial rake angles. A screw 42 retains each insert 37 as indicated in FIG. 15. Forming the insert pocket and chip clearance wall 40 as a common surface, greater material strength is retained in the head as is desirable where the ratio of insert diameter to the cutter is large.

Cutters according to this invention have exhibited efficiencies equal to or less than one horsepower per cubic inch per minute even when taking extremely heavy roughing cuts of steel. One cutter has been successfully used in cutting slots 1.5 wide, 2.5 deep × 5 inches long in a single pass in SAE 1020 and 1045 steels. Typical feed rates were 11 inches per minute — significantly higher than can be used with helical blade type milling cutters traditionally used for such machining. In cutting diameter of 3 inches and smaller cutters according to this invention will remove far more metal in a single pass at a higher feed rate than any other known indexable milling cutter, opening the door to substantially reduced cycle times for a multitude of machining operations.

In large diameter cutters it is possible to employ multiple helix paths for the successive cutting elements in the order of axial incremental spacing, each with the same angular spacing of cutting elements as the other uniformly spaced along each helix. For example, two such paths might start at 180° intervals, or in the case of sufficiently large diameters, three such paths at 120° intervals. In the case of two paths, an angular spacing in the range of 46° to 50° or a preferred range of 47° to 49° might be used.

I claim:

1. An indexable insert milling cutter comprising an annular cylindrical body, a plurality of individual insert pockets formed in the cylindrical periphery of said body, each of said pockets having a seat for holding an insert with its cutting face in a substantially axial plane modified to the extent of any axial and radial rake angles which are the same for every insert, and a minor portion of its cutting edge projecting beyond said periphery, each pocket having a chip clearance wall associated therewith, said wall providing chip clearance space projecting from the entire cutting face to the periphery of said body, each pocket with its chip clearance wall being substantially isolated from every other pocket by surrounding cylindrical periphery of said body, and said insert pockets being uniformly spaced in overlapping cutting relationship in an axial direction and angularly spaced in a circumferential direction on a continuous helical path for progressive cutter entry in milling a workpiece.

2. A milling cutter as set forth in claim 1 wherein each of said pockets is formed with a wall to accommodate a round indexable insert.

3. A milling cutter as set forth in claim 2 wherein each pocket is formed to extend around more than one half of the insert located therein securing it against radial displacement.

4. A milling cutter as set forth in claim 3 wherein said pocket is positioned to locate the insert with its cutting edge projecting beyond the periphery of said annular body to an extent of 8 to 12% of the insert diameter.

5. A milling cutter as set forth in claim 2 wherein said chip clearance wall is enlarged relative to the cutting face of said insert to a level extending slightly below the cutting edge of said cutting face.

6. A milling cutter as set forth in claim 2 wherein said axial spacing is in a range of ¼th to ½ of the instant diameter.

7. A milling cutter as set forth in claim 2 wherein said axial spacing is in the order of 30% of the insert diameter.

8. A milling cutter as set forth in claim 1 wherein said insert pockets are located with uniform angular spacing on a single uniform helix.

9. A milling cutter as set forth in claim 8 wherein said angular spacing is in a preferred range of 94° to 98°.

10. A milling cutter as set forth in claim 8 wherein the angular spacing between the pockets for inserts successively entering cutting engagement with the work piece is equal to 360° divided by the number of pockets.

11. A milling cutter as set forth in claim 8 wherein a left hand helix is used on a right hand cutter.

12. A milling cutter as set forth in claim 2 wherein said annular body is a cylindrical end mill body and the endmost pocket is located radially inward of the other pockets.

13. A milling cutter as set forth in claim 2 wherein said annular body is a cylindrical end mill body and the endmost pocket is located radially inward of the other pockets, and with reduced axial spacing relative to the remaining pockets.

14. A milling cutter as set forth in claim 2 wherein the pocket is dimensioned to receive an insert having a diameter in the order of ¼th of the dia. of the annular cutter body.

15. A milling cutter as set forth in claim 1 including four equally axially spaced pockets, the first two pockets from the end being diametrically opposed and the next two pockets from the end being diametrically opposed and advanced angularly in the direction of cutting action in the order of 60° ahead of said first pair.

16. A milling cutter as set forth in claim 2 wherein each of said pockets is provided with a negative radial rake angle.

17. A milling cutter as set forth in claim 16 wherein each pocket is provided with a negative axial rake angle.

18. A milling cutter as set forth in claim 2 including round inserts, each of said inserts having relief at its inner end to avoid corner engagement with said round pocket.

19. A milling cutter as set forth in claim 1 including means for retaining said insert in its pocket.

20. A milling cutter as set forth in claim 1 including an apertured insert in said pocket wherein the bottom of each insert is conically relieved adjacent said aperture to assure positive seating and to avoid fracture inducing corner stresses and means for retaining said insert in its pocket.

21. A milling cutter as set forth in claim 1 including an apertured insert in said pocket wherein said aperture is countersunk to accommodate a screw head substantially flush with the cutting face of said insert, the bottom of said countersunk surface being conical with an included angle in the order of 120°, and a conical headed screw for retaining said insert in its pocket.

22. A milling cutter as set forth in claim 2, and a threaded hole being provided in said body seat offset from said round pocket wall in a radially inward direction.

23. A milling cutter as set forth in claim 2 including cylindrical inserts wherein a positive rake bevelled cutting edge is provided by bevelling inwardly the upper cylindrical end of said cylindrical insert except for a planar flat immediately adjacent the cutting edge.

24. A milling cutter as set forth in claim 2 wherein said annular body is cylindrical and the endmost pocket is located radially inward of the other pockets, and with reduced axial spacing relative to the remaining pockets, said cutter including an insert for said endmost pocket having a square configuration with rounded corners.

25. A milling cutter comprising an annular body constructed for mounting a plurality of individual cutting elements on its periphery, with a cutting edge of each element extending beyond the periphery, and on a continuous helical path, with equal angular spacing, within a range of 91° to 100°.

26. A milling cutter as set forth in claim 25 wherein said equal angular spacing is within a preferred range of 94° to 98°.

27. A milling cutter as set forth in claim 25 including cutting elements wherein said cutting edge extending beyond the periphery is rounded.

28. A milling cutter as set forth in claim 25 including individual pockets for each of said individual cutting elements surrounded by the periphery of said annular body.

* * * * *